May 20, 1958 W. C. RHEA 2,835,159
LIGHT DIVIDING OPTICAL DEVICE
Filed Aug. 17, 1953
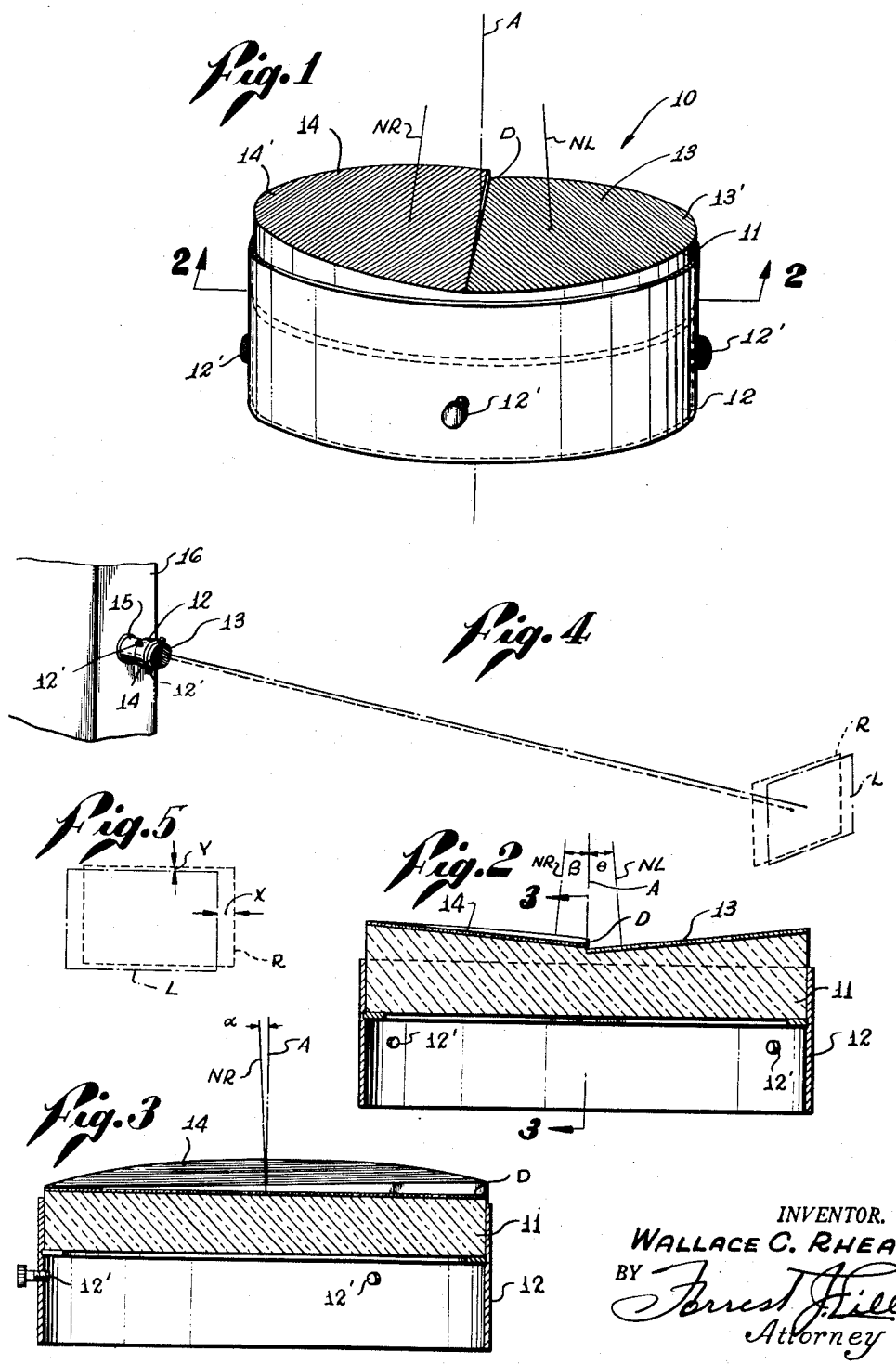
INVENTOR.
WALLACE C. RHEA
BY Forrest J. Lilly
Attorney

United States Patent Office 2,835,159
Patented May 20, 1958

2,835,159

LIGHT DIVIDING OPTICAL DEVICE

Wallace C. Rhea, Los Angeles, Calif.

Application August 17, 1953, Serial No. 374,512

1 Claim. (Cl. 88—1)

This invention relates to an optical device and more particularly to an optical disc adapted to be fitted in front of the lens of a projector for dividing the light beam from said projector lens into two displaced images.

A primary object of the invention is to provide a simple means for realizing a three dimensional effect from a conventional "flat" motion picture film.

Another object is to provide an especially designed optical device for accomplishing the above result, which may be readily fitted over the projector lens of any standard type motion picture machine without necessitating any modification whatever in the projector.

These and further objects and advantages of the invention are attained by means of a transparent optical disc provided with a mounting support for securing the disc to the end of the projector lens tube or housing of a conventional motion picture machine. The optical disc itself has a flat base surface and its opposite surface divided by a dividing line to form two optically flat surface portions inclined at different angles with respect to said flat base surface to form two optical wedges. At least one of the normals to these surface portions of the optical wedges is disposed at an acute angle with respect to the disc axis as a result of the inclination of the surface with respect to the flat base surface. The surface of this portion is also inclined in another direction with respect to the other disc surface portion, whereby a beam of light passing through the disc from the projector lens is split to form two images which are not only displaced horizontally, but also displaced vertically. Preferably the vertical displacement of the images is made less than the horizontal displacement. These relative displacements are an important feature of the present invention in realizing the optimum three dimensional effect as will become clear from the following:

In conventional stereoscopic motion pictures, a three dimensional scene is generally photographed by two separate cameras located a given distance apart, corresponding to the distance between a person's eyes. The resulting images on each film thus represent the scene as would be viewed by each eye of the observer respectively. By projecting these images with suitable filtering means, such as complementary color filters or polarized light, and by employing suitable viewing glasses whereby one eye sees one image only and the other eye sees the other image only, the scene will appear on the screen in much the same manner as viewed in real life. Thus foreground objects will appear to shift with respect to background objects when viewing the scene with one eye, and then with the other. This "parallax" phenomenon adds much to the three dimensional effect. In fact this effect has heretofore been deemed the primary requirement in realizing a three dimensional illusion.

It has been found however, that if images obtained from exactly the same perspective point are displaced and filtered separately to each eye of the viewer, there still results a startling three dimensional effect. One explanation for this phenomenon is that in causing each eye to view only one image, the eyes of the viewer are caused to toe inwardly or outwardly in order that the separate images in each eye may properly register in the brain. This straining of the eyes is registered by the brain and results in the illusion of a three dimensional scene.

To improve further this three dimensional effect, the eyes should not only be caused to toe inwardly or outwardly in a horizontal plane, but should additionally be caused to angulate with respect to each other in a vertical plane. The extent of this latter angulation by the eyes, however, is necessarily considerably less than the toeing in or out in a horizontal plane, in view of the physical construction of the eyeball sockets in the head.

The present invention takes advantage of the above discovered phenomenon to provide a pair of displaced images from a single film strip, which images are displaced both horizontally and vertically. The vertical displacement is made less than the corresponding horizontal displacement to avoid undue eyestrain, but is sufficient to enhance the three dimensional effect.

A better understanding of the invention will be had by referring to the accompanying drawings, in which:

Fig. 1 is a perspective view of a preferred embodiment of the optical device;

Fig. 2 is a cross-section through the optical device taken along the lines 2—2 of Fig. 1;

Fig. 3 is another cross-section of the optical device taken along the lines 3—3 of Fig. 2;

Fig. 4 is a schematic diagram illustrating the optical device in operation on a projector and the resulting displaced images; and Fig. 5 is a normal view of the displaced images shown in Fig. 4.

Referring to Fig. 1, the optical device is indicated generally by the numeral 10. As shown, this device comprises an optical disc 11 and cylindrical mounting or support 12, secured about the lower periphery of the disc. This supporting cylinder 12 is adapted to be fitted over and centered on the lens tube of a conventional projector by means of set screws 12' to support the optical disc in front of the projector lens.

One surface of the optical disc 11 is divided by a dividing line D into two optically flat surface portions 13 and 14. The surface portion 13 is provided with a polarizing means 13' to polarize light passing therethrough in a given direction. Similarly, the surface portion 14 is provided with a polarizing means 14' polarizing light passing therethrough in a direction at right angles to said given direction, whereby ultimately projected images from the optical disc may be filtered to each eye of an observer.

The surface portions 13 and 14 may be formed by proper grinding of the surface of a conventional optical disc to form the desired optically flat surface portions.

As shown in Fig. 1, the normal to the surface portion 13 is designated NL and is inclined at an acute angle to the axis A of the optical disc 11. Similarly, the normal NR of the surface portion 14 may be inclined at an acute angle with respect to the axis A. In addition, the normal to one of the surface portions, such as the surface portion 14 shown in Fig. 1, has its normal at an acute angle to the axis A as viewed through a plane including the axis A and dividing line D.

The relationships of these normals with respect to the axis of the optical piece 11 is clearly shown in Figs. 2 and 3. Referring to Fig. 2, it will be noted that the normal NL to the surface portion 13 is inclined at an acute angle $\theta$ to the optical disc axis A as viewed through a plane perpendicular to the plane including the axis A and the dividing line D, this plane being the plane of the section view of Fig. 2. Similarly, the normal NR of the surface portion 14 is inclined at an acute angle B with respect to the axis A as viewed in the same plane. In Fig. 3, it will be noted that the normal NR to the surface portion 14 is also inclined to the axis A at an acute angle $\alpha$ when viewed through the plane including the axis A and the dividing line D. This latter plane is the plane of the section view of Fig. 3.

With the above described relative positions of the two optically flat surface portions 13 and 14, when the disc is placed in front of a projector lens tube 15 of a projector 16 as shown in Fig. 4, the light beam from the lens will be divided into two beams forming images L and R, the R image being displaced horizontally from the L image in an amount proportional to the value of the angles $\theta$ and B, and displaced vertically from the L image by an amount proportional to the angle $\alpha$. This splitting of the beam is caused by the well known refraction phenomenon of the light beam due to the wedge effect of the surface portions.

In Fig. 5 the horizontal displacement is designated X while the vertical displacement is designated Y. Since the relative movement of a person's eyes in a horizontal plane with respect to each other may be considerably greater than the relative movement of a person's eyes in a vertical direction with respect to each other, the eyes can accommodate a greater displacement in a horizontal direction than in a vertical direction. Accordingly, the optical surface portions of the optical disc 13 are designed to provide relative horizontal and vertical displacements which may be easily accommodated by a person's eyes.

A viewer of the images L and R employs polarized glasses to separate the images, permitting one image to go to one eye and the other image to go to the other eye. Thus the eyes are caused to toe inwardly or outwardly in a horizontal plane as well as move in a vertical plane relative to each other, thereby "straining" them to create in the viewer's brain the desired three dimensional effect as previously described.

While the present invention has been described in connection with the projection of conventional "flat" motion picture films, it is to be understood, of course, that the optical device may be employed with any type projector to provide displaced images. Thus, such projector may be for projecting "still" pictures or for projecting television images from a conventional television set. The use of the word projector is therefore to be considered in its broadest scope as embodying any apparatus for projecting any type of picture.

I claim:

An optical device adapted to be placed in front of a projector lens to split a beam of light from said projector lens into two beams to form images horizontally and vertically displaced with respect to each other, said optical device comprising: a transparent optical disc having a flat base surface and an opposite surface divided by a single diametric dividing line to form two optically flat surface portions inclined at different angles with respect to said base surface to form two optical wedge portions; the normals of said surface portions of said optical wedge portions, as a result of the inclination of the surface portions, forming equal acute angles with respect to the axis of said disc as viewed through a plane perpendicular to said dividing line; one of said normals as a result of the different inclination of its surface portion, also forming an acute angle with respect to said axis of said disc as viewed through a plane including said axis of said disc and said dividing line, said latter mentioned acute angle being less than either of said equal acute angles so that when said disc is oriented on said projector lens with its dividing line in a vertical direction, the vertical displacement of said images is less than the horizontal displacement thereof; and polarizing means provided on said two surface portions, the polarization of one surface portion being substantially at right angles to the polarization of the other surface portion, whereby said displaced images may be filtered.

References Cited in the file of this patent

UNITED STATES PATENTS

| 1,351,430 | Luboshey | Aug. 31, 1920 |
| 1,840,931 | Bjorn | Jan. 12, 1932 |
| 2,023,246 | Sears | Dec. 3, 1935 |
| 2,268,338 | Kober et al. | Dec. 30, 1941 |
| 2,329,294 | Ramsdell | Sept. 14, 1943 |
| 2,341,827 | Sukumlyn | Feb. 15, 1944 |
| 2,533,719 | Christiani | Dec. 12, 1950 |